United States Patent [19]

Gusev et al.

[11] 4,150,430

[45] Apr. 17, 1979

[54] INFORMATION SELECTION DEVICE

[76] Inventors: Valery F. Gusev, ulitsa Karbysheva, 13a, kv. 35; Gennady N. Ivanov, ulitsa Dekabristov, 184-a, kv. 22, both of Kazan; Vladimir Y. Kontarev, ploschad Junosti, 4, kv. 3; Vyacheslav Y. Kremlev, Berezovaya alleya, korpus 423, kv. 81, both of Moscow; Mansur Z. Shagivaleev, ulitsa Karbysheva, 17, kv. 75, Kazan; Jury I. Schetinin, 103536, korpus 503, kv. 106, Moscow; Azat U. Yarmukhametov, ulitsa Adelya Kutuya, 12, kv. 23; Genrikh I. Krengel, ulitsa Ibragimova, 45, kv. 49, both of Kazan, all of U.S.S.R.

[21] Appl. No.: 811,848

[22] Filed: Jun. 30, 1977

[30] Foreign Application Priority Data

Jul. 7, 1976 [SU] U.S.S.R. .............................. 2379701

[51] Int. Cl.² .............................................. G06F 7/02
[52] U.S. Cl. .................................................. 364/200
[58] Field of Search ........................ 364/200 MS File

[56] References Cited

U.S. PATENT DOCUMENTS

| 3,771,146 | 11/1973 | Cotton et al. | 364/200 MS File |
| 3,930,236 | 12/1975 | Ferguson et al. | 364/200 |

*Primary Examiner*—Harvey E. Springborn
*Attorney, Agent, or Firm*—Lackenbach, Lilling & Siegel

[57] ABSTRACT

The proposed information selection device includes an initial address register and a memory address forming unit. The forming unit is electrically connected to two coincidence circuits, a functional return address jump register and a control information decoder. The control information decoder is connected to a memory unit for storing control information. A constant register connected to the functional return address jump register. A control information register is connected to the control information decoder. The control information decoder is connected to each of the coincidence circuits. An analysis signal register is connected to an analysis signal forming decoder. A comparison code register and a comparison mask register are also included. To both coincidence circuits there is connected a comparison unit for comparing information, which is being analyzed, with a respective code. The comparison unit is electrically coupled to the analysis signal forming decoder, the initial address register, the comparison code register, the comparison mask register, two counters, two data buses and a state of the device analysis buffer register connected to the control information decoder. The device of the present invention makes it possible to select any information code digits required for the ayalysis and analyze them by comparing them with the reference code value.

2 Claims, 2 Drawing Figures

INFORMATION SELECTION DEVICE

FIELD OF THE INVENTION

The present invention relates to computers and, more particularly, to information selection devices.

The invention can be used to advantage in data processing devices, namely, in microprogram processors and channels of computers.

DESCRIPTION OF THE PRIOR ART

There is known an information selection device (cf. S. Hasson, Microprogrammnoye upravleniye/Microprogram Control/, Moscow, 1974, pp. 182-183) comprising, in series connection, an initial address register, a memory address forming unit which is electrically coupled to a functional return address jump register with two counters, and a memory unit for storing control information connected to a control information register, an analysis signal register and a constant register whose output is connected to the functional return address jump register, as well as a control information decoder and an analysis signal forming decoder, whose inputs are connected to the outputs of the control information register and the analysis signal register, respectively, their outputs being electrically coupled to the memory address forming unit, the output of the control information decoder being connected to the functional return address jump register, the output of the constant register serving as the output of the device.

The foregoing device is disadvantageous because the return address branching system is oriented towards a specific realization of microprograms and analysis of jump conditions is related to a specific situation occuring in the course of execution of these microprograms, which does not make it possible to employ the branching system for a different system of instructions.

In addition, in the device under review, return address branching takes a number of directions of which only two are actually needed. As far as the other directions are concerned, these involve operations similar to those performed on the first two directions, which accounts for an increased storage capacity of the memory unit used to store control information.

SUMMARY OF THE INVENTION

It is an object of the present invention to provide an information selection device which would make it possible to realize any required system of instructions without modifying the device.

It is another object of the invention to reduce the storage capacity of the memory unit for storing control information.

The foregoing and other objects of the present invention are attained by providing an information selection device which includes an initial address register and a memory address forming unit. The forming unit is electrically coupled to a functional return address jump register with two counters and a memory unit for storing control information. The memory unit is connected to a control information register, an analysis signal register and a constant register. The constant register has an output connected to the functional return address jump register. A control information decoder is connected to the control information register. An analysis signal forming decoder whose inputs are connected to the outputs of the control the analysis signal register. The outputs of the control information decoder are electrically coupled to the memory address forming unit and the functional return address jump register. The output of the device is connected to the output of the constant register. The device also includes, in accordance with the invention, a comparison unit for comparing information being analyzed with a respective code, whose control inputs are connected to the outputs of the analysis signal forming decoder. Information inputs of the comparison unit are connected to outputs of the initial address register, counters and data buses. A state of the device analysis buffer register has one input connected to the control information decoder and an output connected to another information input of the comparison unit. Coincidence circuits have inputs connected to the output of the comparison unit and other inputs connected to the output of the control information decoder, the outputs of the coincidence circuits being connected to the memory address forming unit. A comparison code register and a comparison mask register, whose outputs are connected to two other information inputs of the comparison unit, are also included. The remaining information input of the comparison unit and the other input of the analysis buffer register are connected to the inputs of the device.

It is expedient that the comparison unit should include a coincidence circuit and comparison circuits forming a matrix, the number of columns corresponding to the number of states of the device being simultaneously analyzed and the number of lines corresponding to the digit capacity of the analysis signal register. The control inputs of the comparison circuits of each line of the matrix being combined and connected to the respective control inputs of the comparison unit. Information inputs of the comparison circuits of each line of the matrix are connected to the respective information inputs of the comparison unit. Other information inputs of the comparison circuits of each column of the matrix are combined and connected to the respective information inputs of the comparison unit. Outputs of the comparison circuits of each column of the matrix are also combined and connected to the respective input of the coincidence circuit, whose output is connected to the output of the comparison unit.

The present invention makes it possible to select any information code digits required for analysis and analyze them by comparing them with the reference code value.

In addition, while analyzing individual circuits of the device, the invention makes it possible to branch the program in only two directions, either finding the code being searched for or all the other codes.

BRIEF DESCRIPTION OF THE DRAWINGS

Other objects and advantages of the present invention will become more apparent from the following detailed description of a preferred embodiment thereof to be read in conjunction with the accompanying drawings, wherein.

DETAILED DESCRIPTION OF THE INVENTION

Consider the use of the proposed information selection device in a microprogram control computer.

Figure 1:
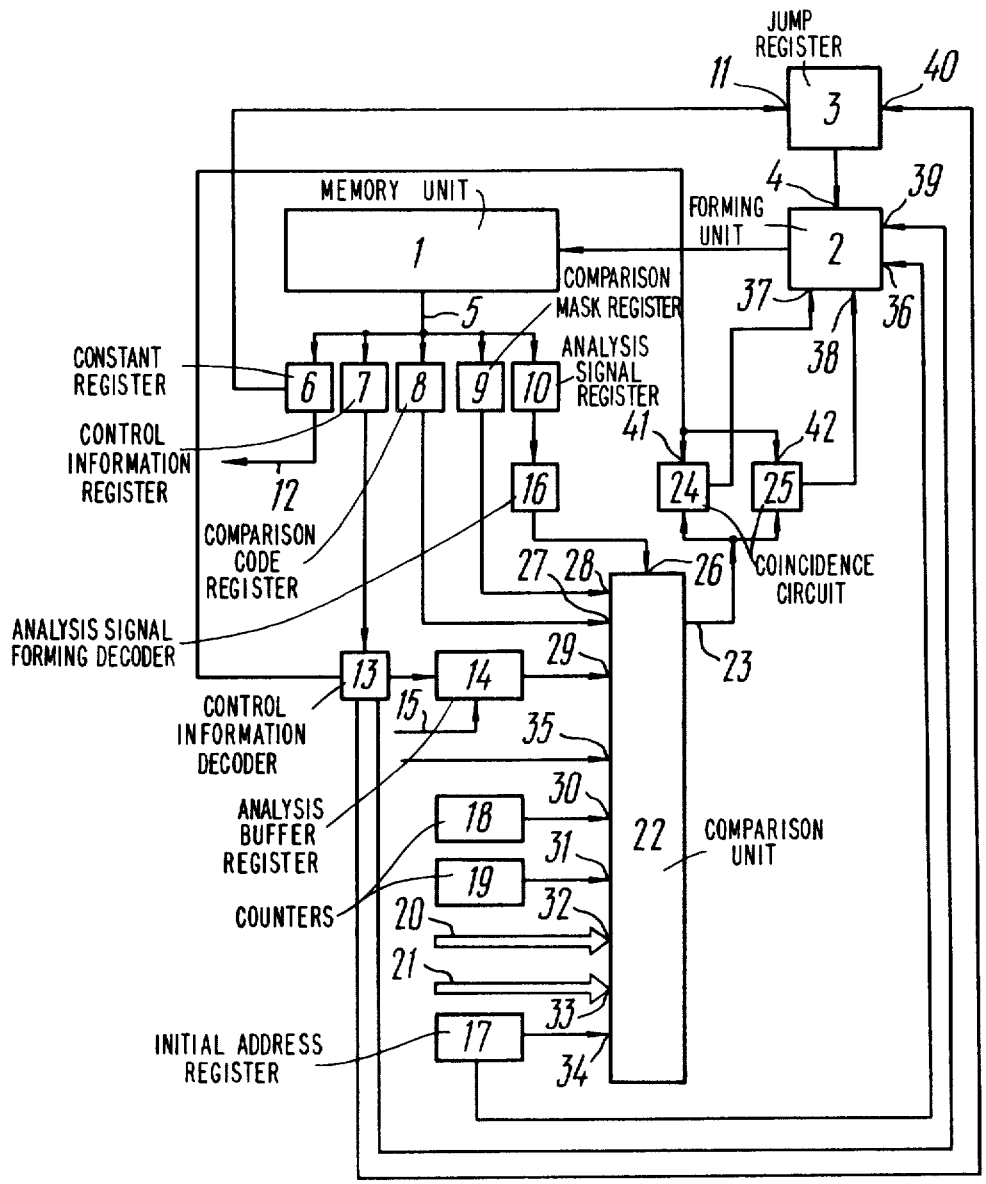
FIG. 1 is a block diagram of an information selection device in accordance with the invention.

The proposed information selection device includes a control information storage or memory unit 1 (FIG. 1). A memory address forming unit 2 has an output connected to an input of the memory unit 1. A functional return address jump register 3 has an output connected to an forming input 4 of the unit 2. An output 5 of the memory unit 1 is connected to inputs of a constant register 6, a control information register 7, a comparison code register 8, a comparison mask register 9, and an analysis signal register 10. One output of the constant register 6 is connected to an input 11 of the jump unit 3 and the other output 12 is connected to the output of the device. The output of the control information register 7 is connected to the input of a control information decoder. A state of the device analysis buffer register 14 has an input connected to one of the outputs of the control information decoder 13. The other input 15 of the analysis buffer register 14 is connected to the first input of the device. The output of the analysis signal register 10 is connected to the input of an analysis signal forming decoder 16. The device of this invention further includes an initial address register 17, two counters 18 and 19, two data buses 20 and 21, and a comparison unit 22 for comparing information being analyzed with a respective code. The output 23 of the comparison unit 22 is connected to inputs of two coincidence circuits 24 and 25. A control input 26 of the unit 22 is connected to the output of the analysis signal forming decoder 16. Information inputs 27 and 28 of the comparison unit 22 are connected to the comparison code register 8 and the comparison mark register 9 respectively. Information inputs 29, 30, 31, 32, 33 and 34 of the comparison unit 22 are connected to outputs of the buffer register 14, the counters 18 and 19, the data buses 20 and 21, and the initial address register 17, respectively. An information input 35 of the unit 22 is connected to the second input of the device. Inputs 36, 37, 38 and 39 of the forming unit 2 are connected to outputs of the register 17, the coincidence circuits 24 and 25, and the control information decoder 13, respectively. An input 40 of the jump unit 3 and inputs 41 and 42 of the coincidence circuits 24 and 25 are connected to outputs of the control information decoder 13. (To simplify the drawings, a single line is shown connecting the control information decoder 13 and the coincidence circuits 24 and 25. It should be understood that this line is a cable in which several lines can be placed.)

The comparison unit 22 for comparing information being analyzed with comprises comparison circuits 43 (FIG. 2) which make up a matrix 44. Control inputs 45 of the comparison circuits 43 of each line of the matrix 44 are combined and are connected to the respective control input 26 (FIG. 1) of the comparison unit 22. Information inputs 46 (FIG. 2) of the comparison circuits 43 of each line of the matrix 44 are connected to the information inputs 29, 30, 31, 32, 33, 34 and 35 of the comparison unit 22 (FIG. 1). Information inputs 47 and 48 (FIG. 2) of the comparison circuits 43 of each column of the matrix 44 are connected to combined and are the inputs 27 and 28 (FIG. 1), respectively, of the comparison unit 22. The comparison unit 22 also includes a coincidence circuit 49 (FIG. 2) whose inputs are connected to outputs 50 of the comparison circuits 43 of each column of the matrix 44. An output 51 of the coincidence circuit is connected to the output 23 (FIG. 1) of the comparison unit 22.

The proposed information selection device operates as follows.

The execution of each data processing operation produced in the form of an instruction takes a certain number of time steps, thus it is necessary to select a corresponding number of control words in a predetermined sequence from the memory unit 1 (FIG. 1) for storing control information.

Thus, computer control boils down to selecting information contained in the memory unit 1. The beginning of each sequence of control words is determined by the initial address code stored in the initial address register 17. This code is applied from the register 17 to the input 36 of the memory address forming unit 2. The unit 2 forms the address of the first control word of the sequence and sends it to the input of the memory unit 1. The control word selected in accordance with the given address is applied to the constant register 6, the control information register 7, the comparison code register 8, the comparison mask register 9 and the analysis signal register 10. The control information code of the register 7 is applied to the control information decoder 13 and actuates the functional return address jump register 3, the memory address forming unit 2 and the analysis buffer register 14.

The constant register 6 stores the received constant (which is a part of the control word). By a signal from the control information decoder 13 applied to the input 40 of the jump register 3, the constant is applied to the input 11 of said register 3 and is thus entered in said register 3. The constant thus received is the predetermined return address. At the required moment of time and by an unconditional return jump signal applied from the control information decoder 13 to the input 39 of the memory address forming unit 2, the return address is applied from the jump register 3 to the input 4 of the forming unit 2 and, via said unit 2, to the memory unit 1 as the address of the next control word.

Thus, there is effected a return to the basic sequence of control words of the main program, which is common for a number of different word sequences of various subprograms. The return address must be loaded prior to the entry to the subprogram and the unconditional return jump signal is initiated during the last time step of the subprogram.

When operating in the mode of selecting information according to the results of comparison, each next word applied from the memory unit 1 to the constant register 6, the control information register 7, the comparison code register 8, the comparison mask register 9 and the analysis signal register 10 contains information on this operating mode. The analysis signal code is applied from the register 10 to the analysis signal forming decoder 16 which sends one of the analysis signals to the control input 26 of the comparison unit 22. A reference code is applied to the input 27 of the comparison unit 22 from the output of the comparison code register 8. The comparison unit 22 compares, digit by digit, the information being checked with the reference code. If these fully correspond to each other, a signal is applied from the output 23 of the comparison unit 22 to the inputs of the coincidence circuits 24 and 25. If it is necessary to branch according to the results of the comparison by modifying the address of the memory unit 1, a signal is applied from the control information decoder 13 to the input 41 of the coincidence circuit 24. If there is a comparison signal at the output 23 of the comparison unit 22, the coincidence circuit 24 produces a signal applied to the input 37 of the forming unit 2 to modify the address digits, thus selecting one of the two possible directions which the processing operation may take, which means that either code being searched for is found or all the other codes are found. In such a case branching is effected only towards the two control words irrespective of the digit capacity of the code being analyzed within the digit capacity of the comparison unit 22.

If it is necessary to effect branching according to comparison analyses by substituting the next address for a predetermined address, a signal from the control information decoder 13 is applied to the input 42 of the coincidence circuit 25. If there is a comparison signal at the output 23 of the comparison unit 22, the coincidence circuit 25 produces a signal applied to the input 38 of the forming unit 2. By this signal the jump address entered in the jump register 3 is transferred from the jump register 3 via the forming unit 2 to the memory unit 1; as this takes place, the sequence of selecting control words from the memory unit 1 is discontinued and another sequence of selection is carried out, beginning with the jump address entered in the register 3. This technique makes it possible to discontinue the processing operation and start the next operation without completing the previous one, which substantially increases the operating speed of the device.

On a number of occasions it is necessary to check only some of the information code digits for coincidence with the reference code, without checking all of them. In order to select that part of the information code digits that are to be checked, the comparison mask code is applied from the comparison mask register 9 to the input 28 of the comparison unit 22. The comparison mask code contains ones in those digits where digit-by-digit comparison is to take place and zeros in those digits where the value of the information code being checked is of no importance.

The foregoing mode of operation makes it possible to select any information code digit to be subjected to analysis.

By performing the operation of comparing the code, stored in the initial address register 17, with a respective comparison code stored in the comparison code register 8, it is possible to find out which instruction is being fulfilled at a given moment. Superposition of a respective mask makes it possible to establish to which group of instructions belongs the instruction which is currently being executed.

By comparing the codes, transmitted through the data buses 20 and 21, with a respective comparison code, it is possible to separate the code being searched for (for example, the sign or attribute code). By comparing the codes stored by the counters 18 and 19 with a predetermined code, one can analyze the number of data processing cycles that have been completed. By comparing information at the input 35 of the comparison unit 22 with a respective comparison code, one can analyze the state of peripheral objects. It is often necessary to use the result of data or state analysis several time steps back. The results of such analyses is stored by the analysis buffer register 14. The result of the analysis is entered in the register analysis buffer 14 through the input 15 in the course of distributing information among the computer units (not shown). The checking of the result of analysis by comparing it to the expected standard saves time, as well as cells of the unit memory 1, because it makes it unnecessary to repeat the transmission of information at the moment of the analysis.

Figure 2:
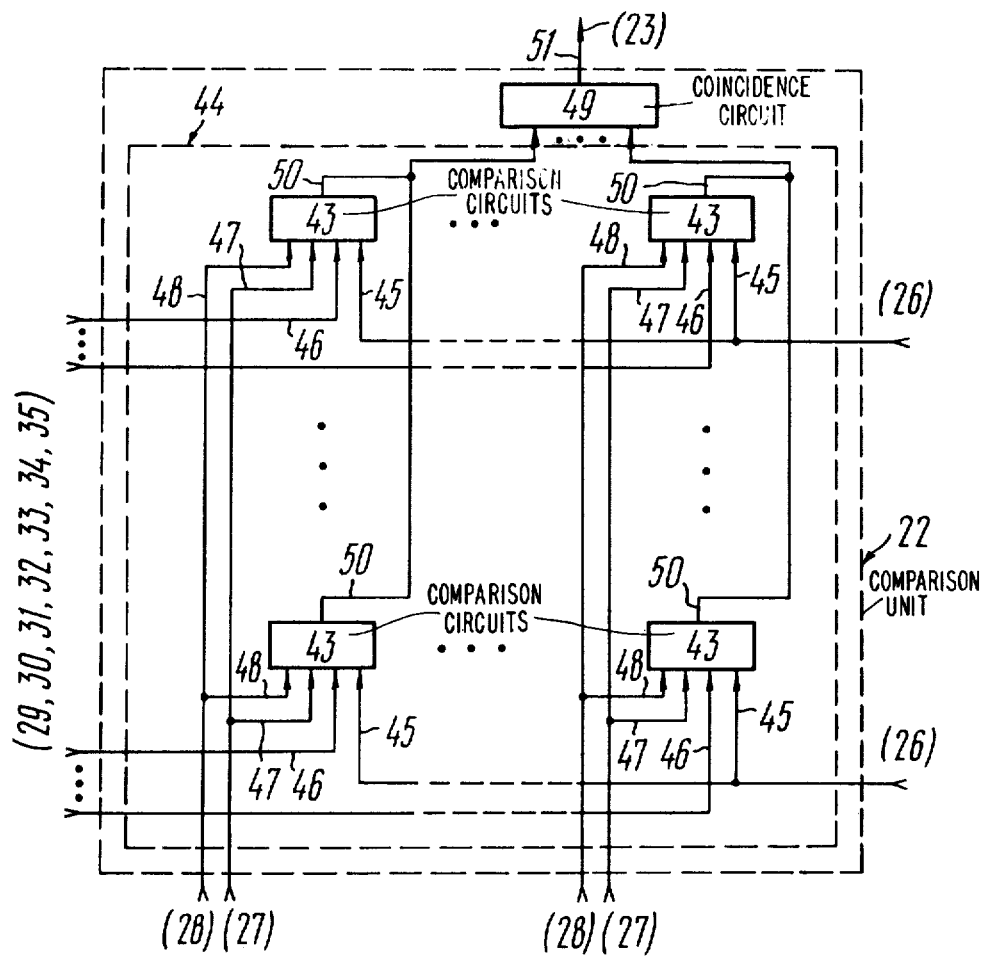
FIG. 2 is a block diagram of the unit for comparing information being analyzed with a respective code of the proposed information selection device.

Consider operation of the proposed device, wherein the comparison unit 22 (FIG. 1) is constructed as a matrix 44 (FIG. 2).

In the course of performing comparison analysis, an analysis signal is applied from the analysis signal register 10 (FIG. 1) via the analysis signal forming decoder 16 to the input 26 of the comparison unit 22 and actuates a respective line of the matrix 44 (FIG. 2). The analysis signal is applied to the control input 45 of the comparison circuits 43 of the respective line of the matrix 44 and actuates them. The information inputs 46 of the comparison circuits 43 are connected digit by digit to the sources of information being checked, from which the code of information being checked arrives. To the input 27 (FIG. 1) of the comparison unit 22 from the comparison code register 8 there is applied the reference code with which the code of information being checked is compared. Each digit of the comparison code is applied to the inputs 48 (FIG. 2) of the comparison circuits 43 of the respective column of the matrix 44. The comparison circuits 43 compare, digit by digit, the code of information being checked with the reference code. The digit-by-digit comparison signals are applied via the outputs 50 of the comparison circuits 43 to the coincidence circuit 49. If the code of information being checked fully corresponds to the reference code, the coincidence circuit 49 initiates a common comparison signal which is applied from the output 51 of the coincidence circuit 49 to the matrix 44. The output 51 is connected to the output 28 (FIG. 1) of the comparison unit 22.

Whenever it is necessary to exclude some digits of the code of information being checked from consideration, a mask is superposed on said code such a mask is applied from the comparison mask register 9 to the input 28 of the comparison unit 22. Each code digit of the comparison mask is applied to a respective column of the matrix 44 (FIG. 2). The comparison circuits 43, to which the zero value of the mask digit is applied through the input 47, invariably produce comparison signals at the output 50, which are applied to the inputs of the coincidence circuit 49. The comparison circuits 43, to which the unity value of the mask digit is applied, compare, digit by digit, the information code with the reference code. Such a mode of operation makes it possible to separate any digits of the code of information being checked, which are to be analyzed.

The foregoing way of programming comparison analyses makes it possible to perform a large number of different analyses and, consequently, to use the proposed device in a large number of microprogram control systems.

What is claimed is:

1. An information selection device comprising:
    a memory unit for storing control information having an input and an output;
    a memory address forming unit having first, second, third, fourth and fifth inputs and an output connected to said input of said memory unit;
    a constant register having an input connected to said output of said memory unit, a first output connected to an output of said information selection device, and a second output;
    a control information register having an input connected to said output of said memory unit, and an output;
    a comparison code register having an input connected to said output of said memory unit, and an output;

a comparison mask register having an input connected to said output of said memory unit, and an output;

an analysis signal register having an input connected to said output of said memory unit, and an output;

an analysis signal forming decoder having an input connected to said output of said analysis signal register, and outputs;

a control information decoder having an input connected to said output of said control information register, and first, second, third and fourth outputs, the first input of said memory address forming unit being connected to the first output of said control information decoder;

a state of the device analysis buffer register having a first input connected to the second output of said control information decoder, a second input connected to a first input of said information selection device, and an output;

an initial address register having a first output connected to the second input of said memory address forming unit, and a second output;

a functional return address jump register having a first input connected to said second output of said constant register, a second input connected to the third output of said control information decoder, and an output connected to the third input of said memory address forming unit;

a first coincidence circuit having a first input connected to the fourth output of said control information decoder, a second input, and an output connected to the fourth input of said memory address forming unit;

a second coincidence circuit having a first input connected to the fourth output of said control information decoder, a second input, and an output connected to the fifth input of said memory address forming unit;

a comparison unit, for comparing information being analyzed with a respective code, having control inputs connected to respective outputs of said analysis signal forming decoder, a first information input connected to said output of said comparison mask register, a second information input connected to said output of said comparison code register, a third information input connected to said output of said state of the device analysis buffer register, a fourth information input connected to said output of said initial address register, a fifth information input connected to a second input of said information selection device, sixth, seventh, eighth and ninth information inputs, and an output connected to said second inputs of said first and second coincidence circuits;

a first counter having an output connected to said sixth information input of said comparison unit;

a second counter having an output connected to said seventh information input of said comparison unit;

a first data bus connected to said eighth information input of said comparison unit; and a second data bus connected to said ninth information input of said comparison unit.

2. A device as claim in claim 1, wherein said comparison unit comprises:

a coindence circuit having inputs and an output; and a plurality of comparsion circuits combined into a matrix, each comparison circuit of said plurality of comparison circuits having a control input, first, second and third information inputs, and an output, the number of columns of said matrix corresponding to the number of states of said information selection device which are analyzed simultaneously, the number of lines of said matrix corresponding to the digit capacity of said analysis signal register, said control inputs of said comparison circuits of said plurality of comparison circuits of each of said lines being interconnected and connected to a respective control input of said comparison unit, said first information inputs of said comparison circuits of said plurality of comparison circuits of each of said columns of said matrix being interconnected and connected to said first information input of said comparison unit, said second information inputs of said comparison circuits of said plurality of comparison circuits of each of said columns of said matrix being interconnected and connected to said second information input of said comparison unit, said third information inputs of said comparison circuits of said plurality of comparison circuits of each of said lines of said matrix being connected to a respective one of said third, fourth, fifth, sixth, seventh, eighth and ninth inputs of said comparison unit, said outputs of said comparison circuits of said plurality of comparison circuits of each of said columns of said matrix being interconnected and connected to a respective input of said coincidence circuit.

* * * * *